US012599105B2

(12) United States Patent
Stinson

(10) Patent No.: US 12,599,105 B2
(45) Date of Patent: Apr. 14, 2026

(54) ANIMAL WASTE COLLECTION AND STORAGE APPARATUS

(71) Applicant: Sandy Stinson, Santa Barbara, CA (US)

(72) Inventor: Sandy Stinson, Santa Barbara, CA (US)

( * ) Notice: Subject to any disclaimer, the term of this patent is extended or adjusted under 35 U.S.C. 154(b) by 35 days.

(21) Appl. No.: 18/816,372

(22) Filed: Aug. 27, 2024

(65) Prior Publication Data

US 2025/0081932 A1     Mar. 13, 2025

Related U.S. Application Data

(60) Provisional application No. 63/581,429, filed on Sep. 8, 2023.

(51) Int. Cl.
*A01K 1/01* (2006.01)
*E01H 1/12* (2006.01)

(52) U.S. Cl.
CPC .............. *A01K 1/01* (2013.01); *E01H 1/1206* (2013.01)

(58) Field of Classification Search
CPC ...... A01K 1/01; A01K 23/005; E01H 1/1206; E01H 2001/1273; E01H 2001/1286; E01H 2001/128; B65F 1/16; B65F 1/1623; B65F 1/1646; B65F 2001/1661; B65F 2001/1669; B65F 2240/136; B65D 25/28; B65D 25/2835; B65D 25/2838; B65D 25/2841; B65D 25/2852; B65D 25/2858; B65D 25/2867; B65D 25/32
See application file for complete search history.

(56) References Cited

U.S. PATENT DOCUMENTS

| | | | | |
|---|---|---|---|---|
| 1,199,680 A | * | 9/1916 | Fabian | B65D 25/32 |
| | | | | 220/764 |
| 3,226,015 A | * | 12/1965 | Manfredonia | B65F 1/068 |
| | | | | 248/101 |
| 3,422,988 A | * | 1/1969 | Lafranca | A47K 10/427 |
| | | | | 220/815 |
| 3,985,409 A | | 10/1976 | Kneier | |
| 4,205,869 A | | 6/1980 | Mathis | |

(Continued)

FOREIGN PATENT DOCUMENTS

WO     WO-2023128756 A1 * 7/2023 ............. A45C 13/26

OTHER PUBLICATIONS

Online Ad: Gladiator Dog Waste Station, https://www.terraboundsolutions.com/product/gladiator-dog-waste-station/, downloaded Dec. 13, 2018.

*Primary Examiner* — Don M Anderson
(74) *Attorney, Agent, or Firm* — Guy Cumberbatch

(57)     ABSTRACT

An apparatus for collecting and temporarily storing animal waste such as dog droppings includes a portable storage container with a pivoting cover movable between an open position and a closed position to keep contents dry. The container is adapted to receive and secure thereto a removable liner bag for easy disposal of the waste. A handle attached to the container pivots the cover open and closed and is hinged to the container so that it remains in an upright vertical position until lifted upward. The user need only ever touch the handle when depositing droppings into the bag. A removable waste scooper is suspended from an outer wall of the container.

21 Claims, 18 Drawing Sheets

(56) References Cited

U.S. PATENT DOCUMENTS

| | | | | |
|---|---|---|---|---|
| 4,666,036 A * | 5/1987 | Bourbon | | B65D 43/14 |
| | | | | 206/45.24 |
| 4,982,863 A | 1/1991 | Skillius | | |
| 5,169,018 A * | 12/1992 | Fiore | | A45C 13/28 |
| | | | | 220/756 |
| 5,419,452 A | 5/1995 | Mueller | | |
| 5,447,252 A * | 9/1995 | Ward | | B65D 81/3816 |
| | | | | 220/756 |
| 5,511,682 A | 4/1996 | Pace | | |
| 5,551,569 A | 9/1996 | Garvin-Mazzarisi | | |
| 5,639,164 A | 6/1997 | Ishino et al. | | |
| 7,665,781 B2 * | 2/2010 | Drexler | | E01H 1/1206 |
| | | | | 294/1.3 |
| 7,806,271 B1 * | 10/2010 | Kraska | | A45C 15/00 |
| | | | | 206/541 |
| 7,980,411 B2 | 7/2011 | Kasbohm | | |
| D643,983 S * | 8/2011 | Lockwood | | D32/53.1 |
| 8,820,566 B2 | 9/2014 | Ude | | |
| 8,944,274 B2 | 2/2015 | Madrid | | |
| 9,078,417 B1 | 7/2015 | Lees | | |
| 9,341,403 B2 * | 5/2016 | Conrad | | F25D 3/08 |
| 9,493,142 B2 * | 11/2016 | Sommer | | E05D 3/022 |
| 9,738,443 B2 | 8/2017 | Ballard | | |
| 9,745,127 B1 | 8/2017 | Stravitz | | |
| 9,745,128 B2 * | 8/2017 | Romano | | B65F 1/068 |
| 9,771,215 B2 | 9/2017 | Rogers | | |
| 9,802,755 B2 | 10/2017 | Chakravarthy | | |
| 9,834,376 B1 | 12/2017 | Stravitz | | |
| 9,938,045 B2 | 4/2018 | Morand | | |
| 9,944,460 B2 | 4/2018 | Hon | | |
| 9,988,210 B2 | 6/2018 | Buck | | |
| 9,994,393 B2 | 6/2018 | Dunn et al. | | |
| 10,006,180 B2 | 6/2018 | Weber | | |
| 10,022,467 B2 | 7/2018 | Chang | | |
| 10,053,283 B1 | 8/2018 | Stravitz | | |
| 10,059,514 B2 | 8/2018 | Bowen | | |
| 10,086,996 B2 | 10/2018 | Dunn | | |
| 10,121,354 B2 | 11/2018 | Starkey | | |
| 10,626,568 B2 | 4/2020 | Hygena | | |
| 10,711,417 B1 * | 7/2020 | Stinson | | B65F 1/002 |
| D925,139 S * | 7/2021 | Stinson | | D30/161 |
| D1,096,014 S * | 9/2025 | Stinson | | D30/161 |
| D1,097,376 S * | 10/2025 | Stinson | | D30/161 |
| 2001/0027980 A1 * | 10/2001 | Perkins | | A45C 13/26 |
| | | | | 220/764 |
| 2005/0017006 A1 * | 1/2005 | Kuo | | B65F 1/1607 |
| | | | | 220/264 |
| 2007/0267426 A1 * | 11/2007 | Arciniegas M. | | B65D 45/16 |
| | | | | 220/756 |
| 2021/0095432 A1 * | 4/2021 | Stinson | | B65F 1/1415 |
| 2024/0208693 A1 * | 6/2024 | Buckley | | B65D 1/22 |

* cited by examiner

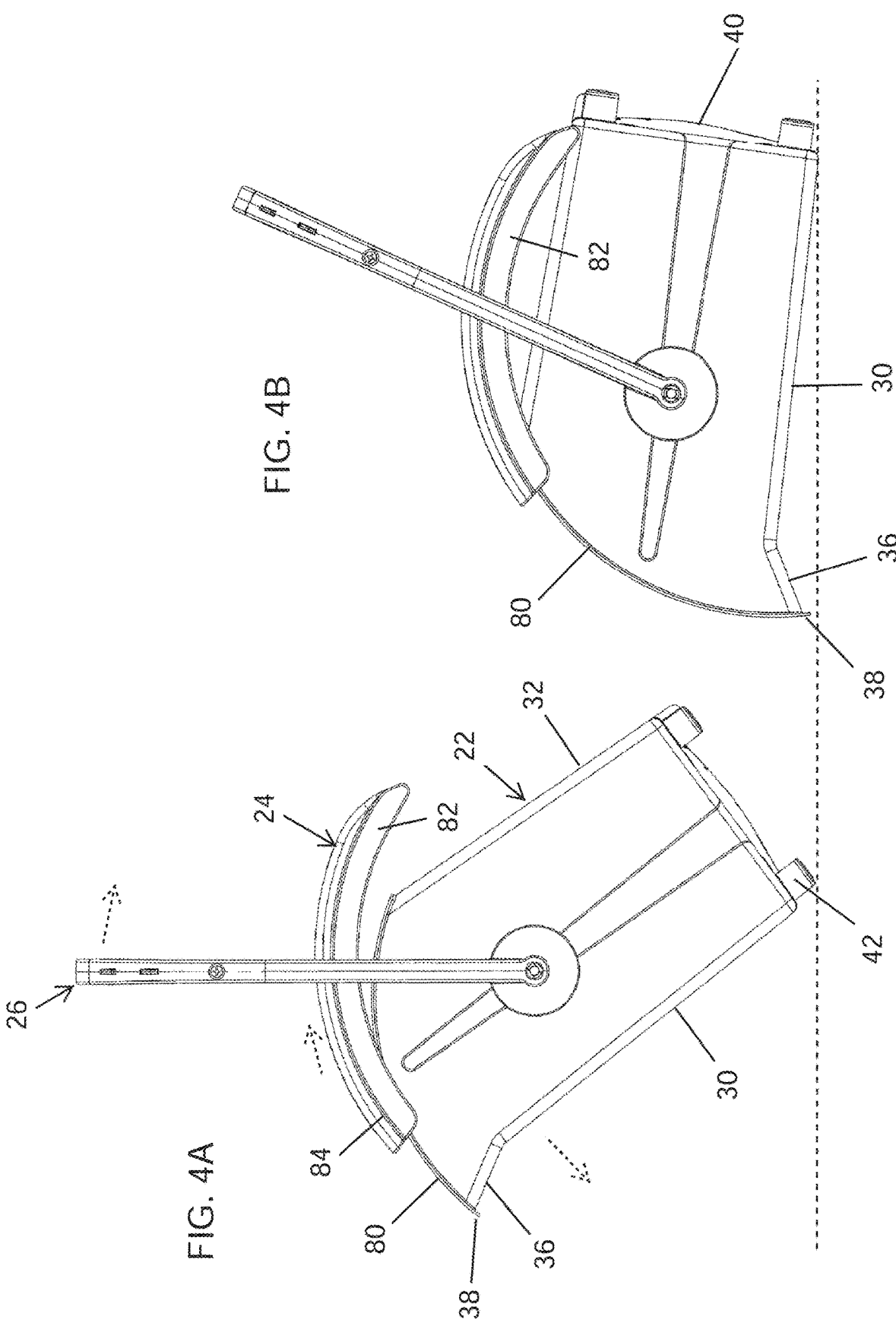

26

24

8A, 8B

26

24

7B

7B

ANIMAL WASTE COLLECTION AND STORAGE APPARATUS

RELATED APPLICATION(S)

The present application claims priority under 35 U.S.C. 119 to U.S. Provisional application No. 63/581,429, filed Sep. 8, 2023, the disclosure of which is incorporated by reference herein.

FIELD OF THE INVENTION

The present invention is directed to a portable container for picking up and storing animal waste and, more particularly, to a storage container which is hygienic and simple to use.

BACKGROUND OF THE INVENTION

Devices for collecting and disposing of animal waste such as droppings come in various shapes and forms. Some devices include an elongated, linear shaft having a handle, and sometimes an operating control, at one end and a waste engaging and collecting mechanism at the second, opposed end. By manipulating the control mechanism with the collecting mechanism disposed adjacent to the droppings, the animal waste may be collected and disposed of in a sanitary manner. Often people simply invert a small plastic or compostable bag and pick up the waste by hand, thereafter dropping the bag into a garbage can.

In the home or apartment setting, waste picked up from the yard must then be taken to the outside garbage can for disposal, which sometimes can be a significant distance. Night-time cleanup elevates the hassle.

There is thus a need for a convenient portable container for temporarily depositing waste between trips to the main garbage.

SUMMARY OF THE INVENTION

It is an object of the present invention to provide an improved container for collecting and storing animal waste. The container allows the user to scoop and deposit the animal waste directly into a convenient disposable bag retained within the container without having to touch any potentially dirty surfaces. The container has a lid which pivots closed to protect the interior from sprinklers, rain, or snow. The container features a number of bag retainers on exterior walls and shaped bags for close-fitting within the container. A convenient scoop for picking up the animal waste is removably secured on the exterior of the container.

A further understanding of the nature and advantages of the invention will become apparent by reference to the remaining portions of the specification and drawings.

BRIEF DESCRIPTION OF THE DRAWINGS

Features and advantages of the present invention will become appreciated as the same become better understood with reference to the specification, claims, and appended drawings.

FIGS. 4A and 4B are right side views of the collecting and storage container with a carry handle moving to a rearward pivot position in the process of tipping the container forward and opening an upper lid to expose an interior within the container for depositing animal waste and replacing a disposable bag therein;

DETAILED DESCRIPTION OF THE PREFERRED EMBODIMENTS

The present application is directed to an improved portable collecting and storage container for animal waste which enables a homeowner or apartment/condo management company to place convenient receptacles around and exterior of the building for temporarily collecting and storing animal waste. The container receives a disposable bag therein into which the animal waste is placed. A convenient scoop attached to an exterior of the container is used to pick up the animal waste, and a handy operating handle enables the user to pivot open an upper lid for dropping animal waste into the disposable bag.

Figure 1A:
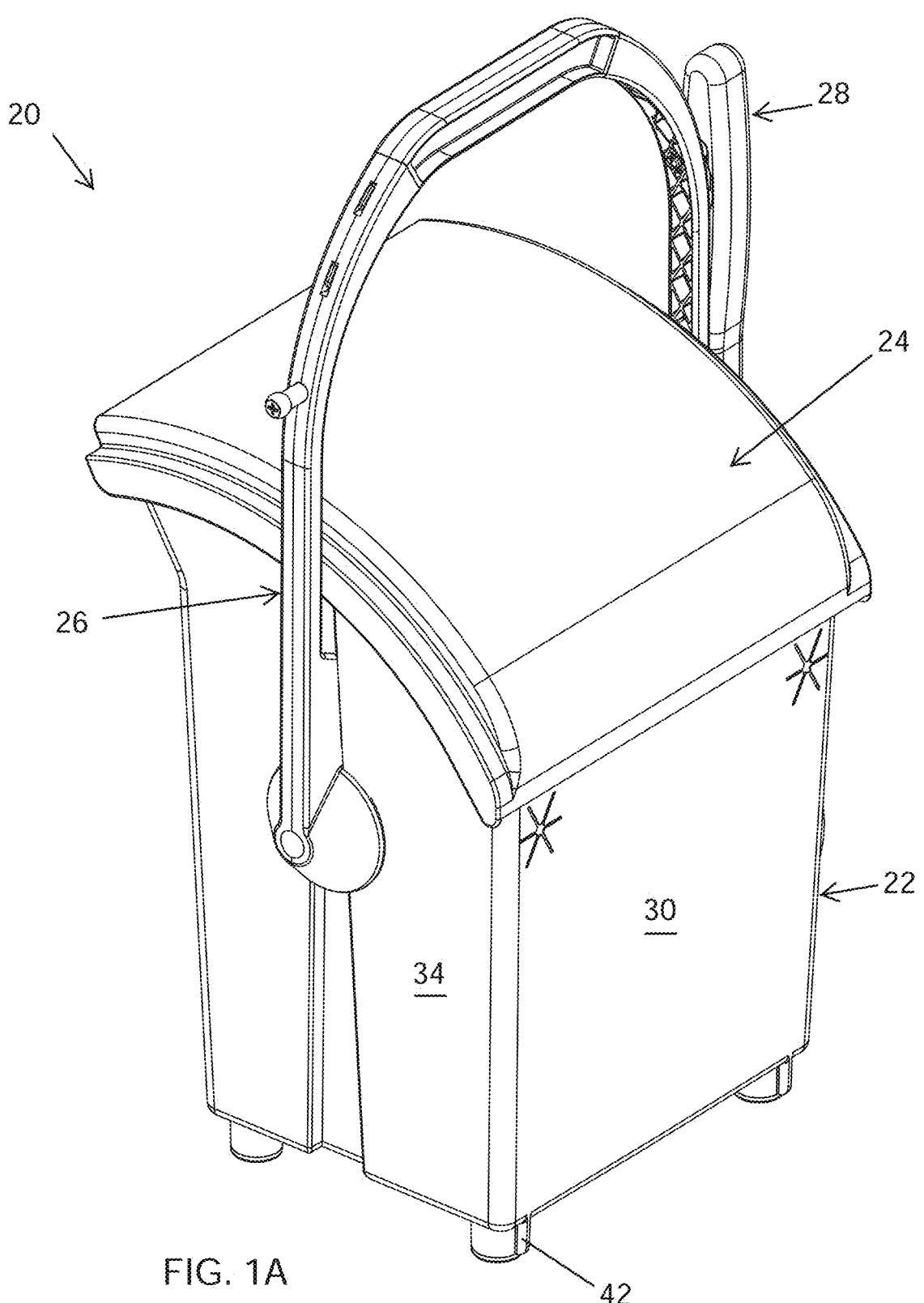
FIGS. 1A and 1B are rear perspective views of the animal waste collecting and storage container of the present application.
Figure 1B:
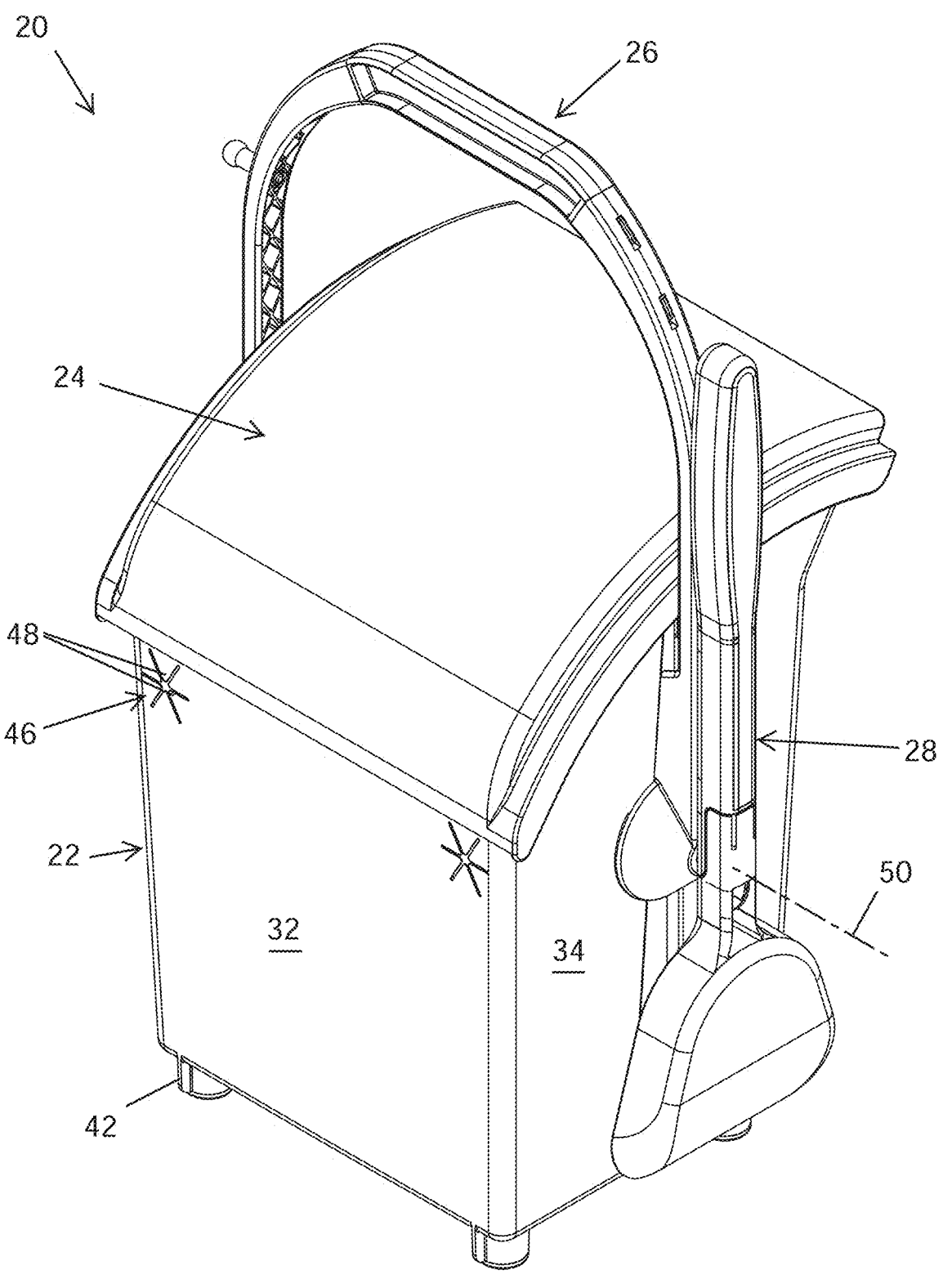
Figure 5:
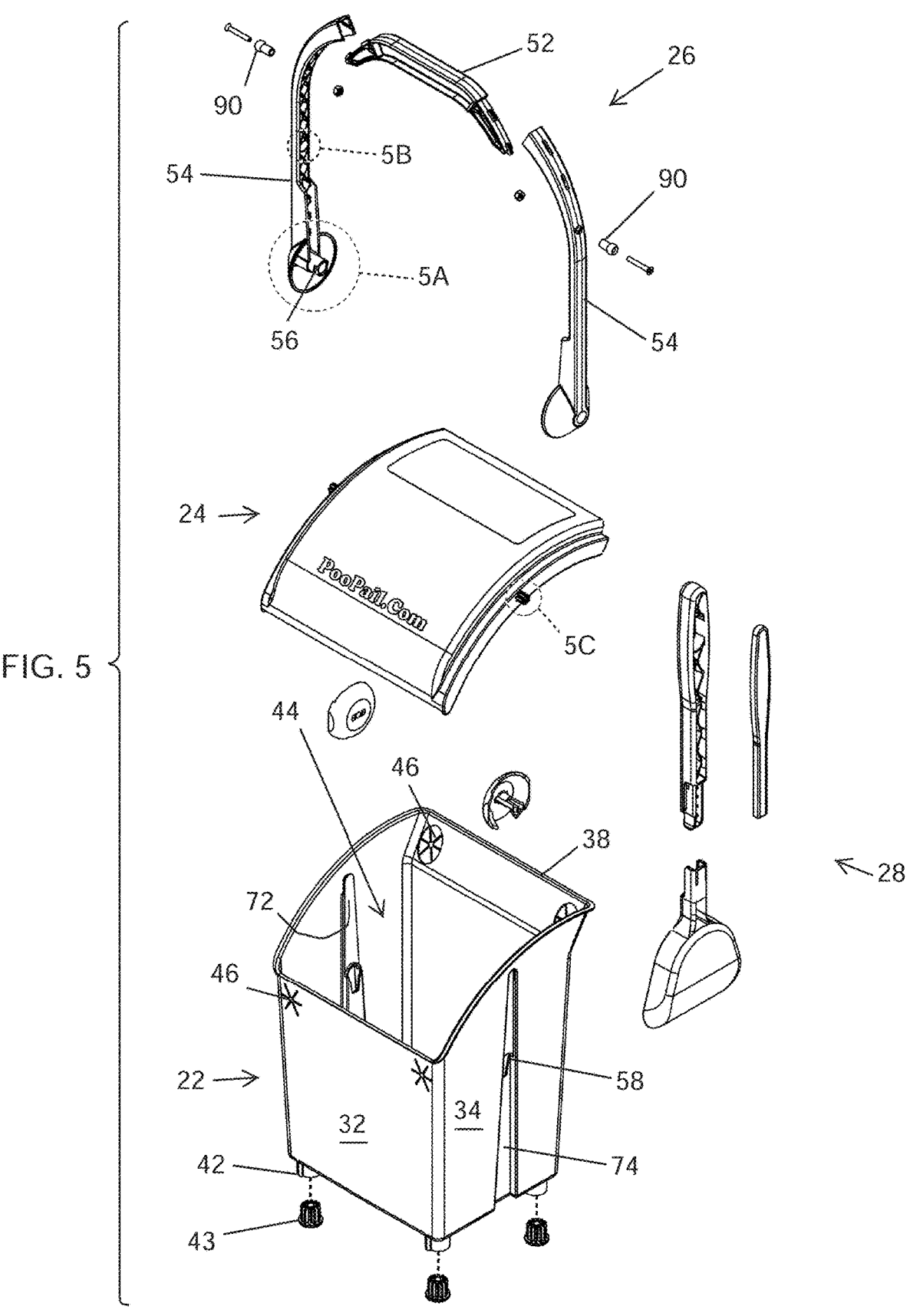
FIG. 5 is an exploded perspective view of the collecting and storage container.

FIGS. 1A and 1B are perspective views of the animal waste collecting and storage container 20 of the present application, while FIG. 5 shows the parts of the container exploded. The container 20 comprises four main elements: a container main body 22, an upper lid 24 arranged to pivot over an open upper mouth of the main body, a control or carry handle 26, and a shovel-like scoop or scooper 28. Preferably, the components of the container 20 are molded from a suitable plastic such as polypropylene and ABS plastic, though other materials are contemplated.

Figure 2:
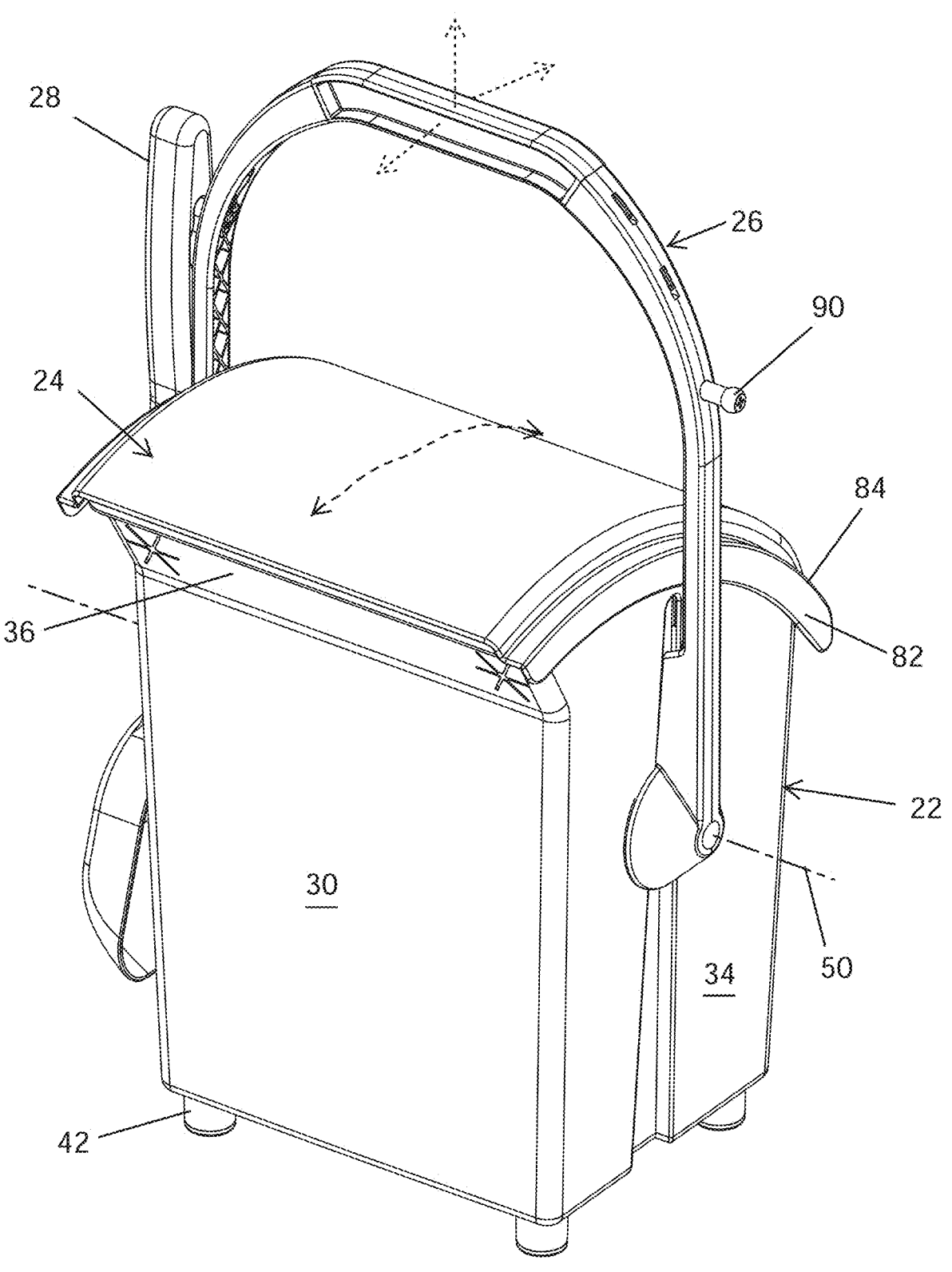
FIG. 2 is a frontal perspective view of the animal waste collecting and storage container showing coordinated movement arrows for both a carry handle and a lid thereof.
Figures 3A, 3B:
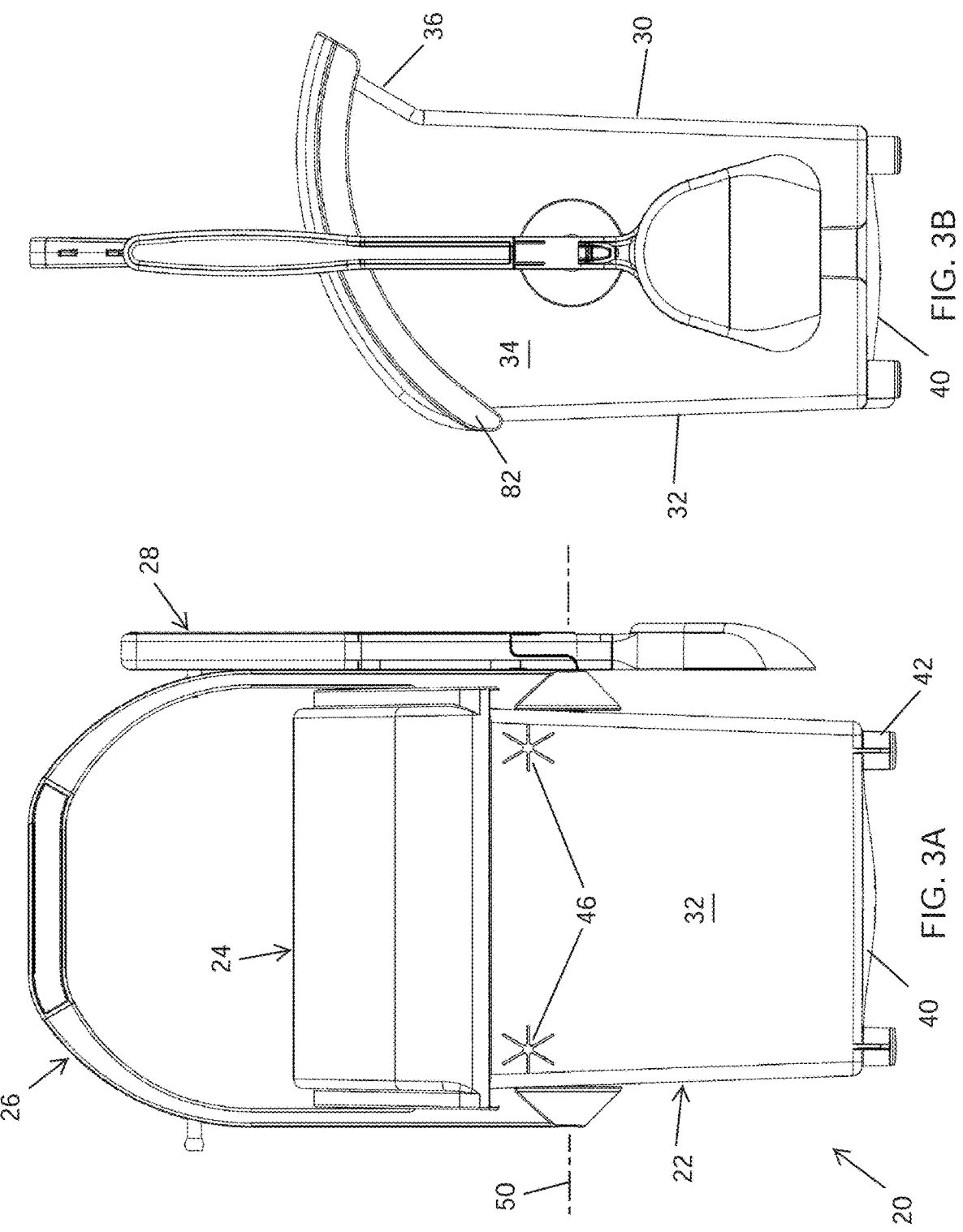
FIGS. 3A and 3B are rear and left side elevational views of the collecting and storage container with a pivoting lid shown in a closed position.

With reference also to the views of FIGS. 2, 3A and 3B, the container main body 22 is generally arranged in a rectilinear three-dimensional shape, with a generally-vertical front wall 30 opposite a rear wall 32, and having two substantially identical side walls 34. Each of the walls 30, 32, 34 are generally vertical or slightly tapered away from each other as they rise higher (to enable stacking for shipping), though an outwardly-angled front panel 36 extends upward from the front wall 30 and terminates in a front lip 38 (see FIG. 4A). An upper mouth of the container main body 22 is defined by the upper edges of the rear and side walls 32, 34 in combination with the front lip 38. A lower floor 40 of the container main body 22 is seen in FIG. 3B and is elevated above the ground by a plurality of short, cylindrical feet 42, preferably four, which extend downward from outer corners of the main body. As seen in FIG. 5, elastomeric (e.g., rubber) plugs 43 may be inserted into hollow lower ends of the feet 42 to provide greater frictional stability as well as plugging up the hollow spaces to prevent ingress of dirt.

An inner space 44 (FIG. 5) is defined within the walls of the main body 22 and above the lower floor 40. In a preferred embodiment, the volume of the inner space 44 is between about 4-6 gallons, requiring a bag liner of roughly 15-16 inches wide by 19 inches tall. Of course, other dimensions are possible, the volume of the inner space 44 desirably being large enough to accept a number, possibly a dozen, of individual deposits of animal waste before becoming full, while at the same time having a relatively small size so as to be easily transported by hand and be placed in a convenient location without being overly obtrusive. The total weight of the empty container 20 is about 2.5 lbs, making the lifting, manipulation and transport easy for most people.

The container main body 22 preferably has bag retaining devices surrounding the upper mouth which receive and retain free upper ends of a disposable bag so as to suspend the bag within the inner space 44. In the illustrated embodiment, four generally star-shaped retainers 46 are molded into both the rear wall 32 and the front angled panel 36. Each pair of retainers 46 are spaced the full width of the respective wall apart from each other so as to spread apart the locations at which the bag is retained. In the preferred embodiment, the retainers 46 comprise thinned flexible leaves or petals 48 defined by a star- or spoke-shaped pattern of lines molded directly into the flexible polymeric material of the container. Molding techniques such as splitting the thinned areas between the inner and outer surfaces of the walls may be used to avoid complicated mold forms or operations. Use of the retainers 46 to secure a bag within the container will be described below.

FIGS. 4A and 4B are right side views of the collecting and storage container 20 with the carry handle 26 moving to a rearward pivot position in the process of tipping the container main body 22 forward and opening the upper lid 24. This sequence occurs when lying the container horizontal to facilitate introduction of large amounts of waste or other materials or when cleaning the inside of the main body 22. (Indeed, the present container may be used as a waste receptacle in general and this position acts much like a dustpan.) It should be understood that a bag will be used as a liner to keep the main body 22 clean, though it is not shown.

The first step in tipping the container is seen in FIG. 2. The handle 26 is initially held vertically in place as shown via a hinge mechanism that will be described below. The handle 26 may be left in the vertical position as shown with the lid 24 in contact with the main body 22, which is convenient for manipulation and subsequent pickup. By lifting the handle 26 upward, the used can then pivot the handle 26 in either direction, and the lid 24 pivots in tandem due to a coupling with the handle. To reach the forwardly-tilted position of the container 20, the use need only pivot the carry handle 26 rearward and push down to start the main body 22 leaning forward, and the lid 24 automatically opens as the main body tilts.

FIG. 4B shows the container 20 horizontal or sideways after the main body 22 is completely tipped forward so that the front lip 38 rests on the ground. The angled front panel 36 elevates the top edge of the main body 22 such that a majority of the front wall 30 is tilted downward toward the floor 40. This helps prevent waste or individual waste bags within the container from rolling out. Once in the sideways position of FIG. 4B, the user may easily scoop animal waste directly into a liner bag 100 (FIG. 10) inside the container main body 22. Preferably, as seen in FIG. 11B, a front edge 118 of the bag 100 desirably extends over the width of the front lip 38 so that no waste can drop down into the inner space 44 of the container, thus keeping the mess contained in the bag. This horizontal orientation is extremely efficient when picking up animal waste, especially multiple piles. The user need only shift the location of the container 20 around the yard and scoop the waste directly into the bag 100 within the inner space 44. This is also a convenient tool/method for cleaning waste from kitty litter boxes.

FIGS. 4A and 4B also show the lower floor 40 of the main body 22 sloped toward a central area. Namely, the lower floor 40 is defined by molded gutters or the like (not shown) extending diagonally between the corners of the floor. Any fluid from condensation or the like is channeled down the gutters toward a plurality of drainage holes (also not shown) near the center of the floor 40. These are shown in prior U.S. Pat. No. 10,711,417 to Stinson, the contents of which are hereby expressly incorporated herein.

Figures 5A, 5B, 5C:
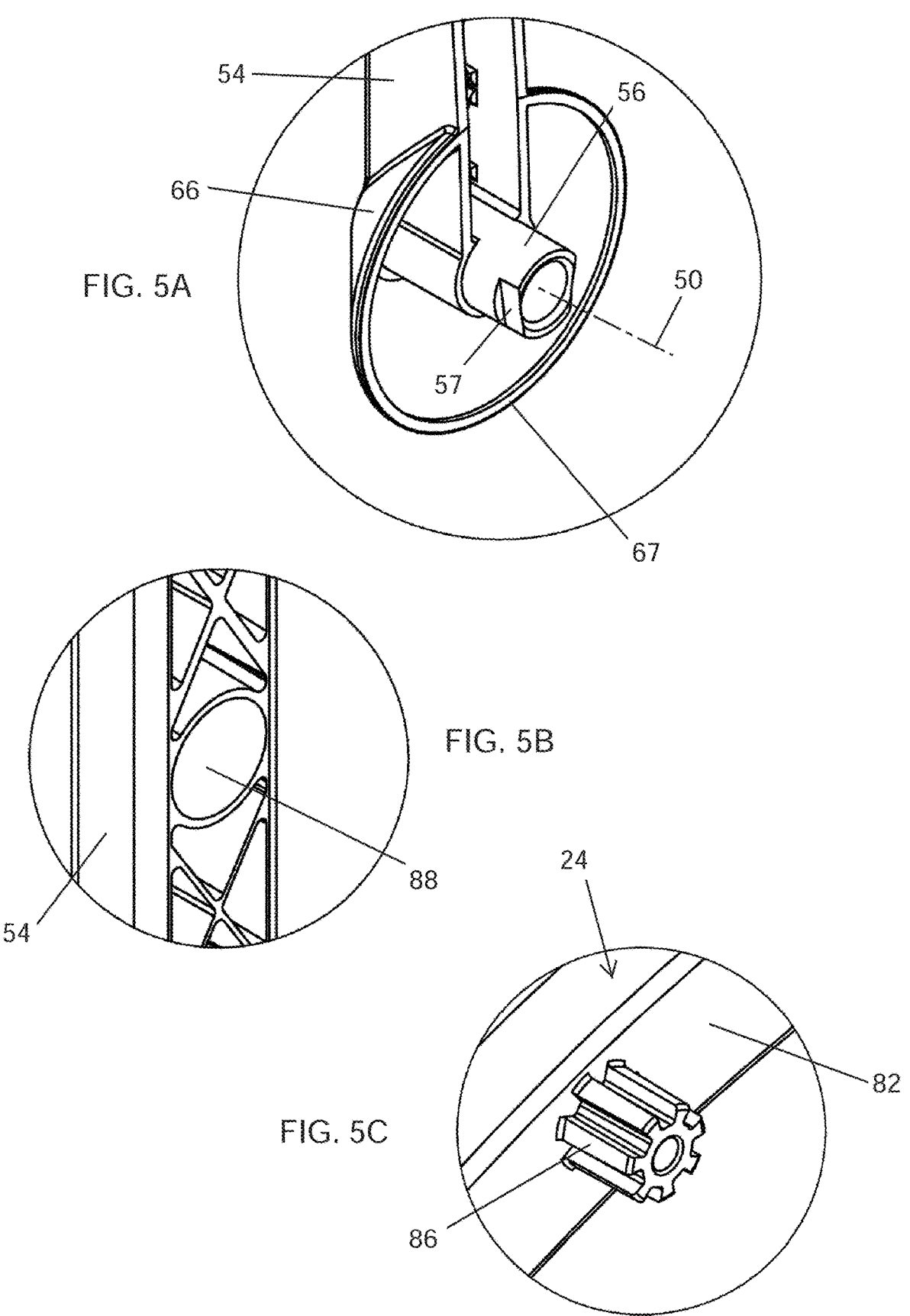
FIGS. 5A-5C are detailed enlargements thereof.

FIG. 5 is an exploded perspective view of the collecting and storage container, and FIGS. 5A-5C are detailed enlargements thereof which illustrate a preferred construction, and with reference to which movement of the versatile carry handle 26 will be described. In general, the handle 26 provides a convenient carry handle as well as a sanitary control of the opening and closing of the upper lid 24. The carry handle 26 pivots forward and backward in a vertical plane relative to the main body 22 about a horizontal axis 50, seen best in FIG. 2.

As seen exploded in FIG. 5, the carry handle 26 preferably includes three sections: a central bridge section 52 flanked by identical arms 54. The lateral ends of the bridge section 52 and the top ends of the arms 54 are molded to have complementary tongue-and-groove style connections with mating tabs which are both inexpensive to fabricate and simple to assemble via a snap-fit, or if necessary adhesive or small screws. The sections 52, 54 are also molded to have a honeycomb inner structure for strength combined with cost and weight savings.

Figures 6A, 6C:
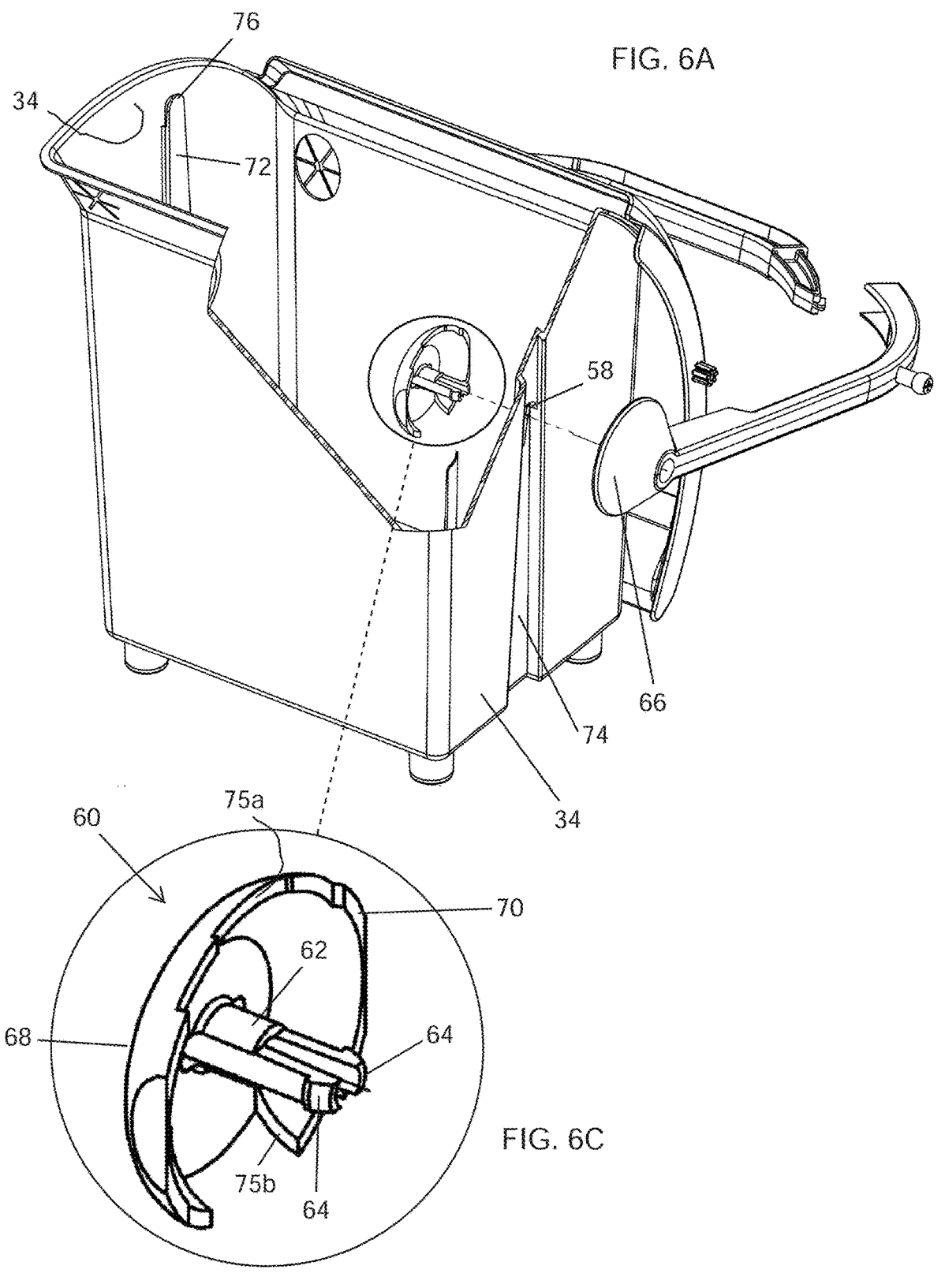
FIGS. 6A and 6B are perspective cutaway views of the animal waste collecting and storage container illustrating a hinge mechanism.
FIG. 6C is an enlargement of an inner axle member.
Figure 6B:
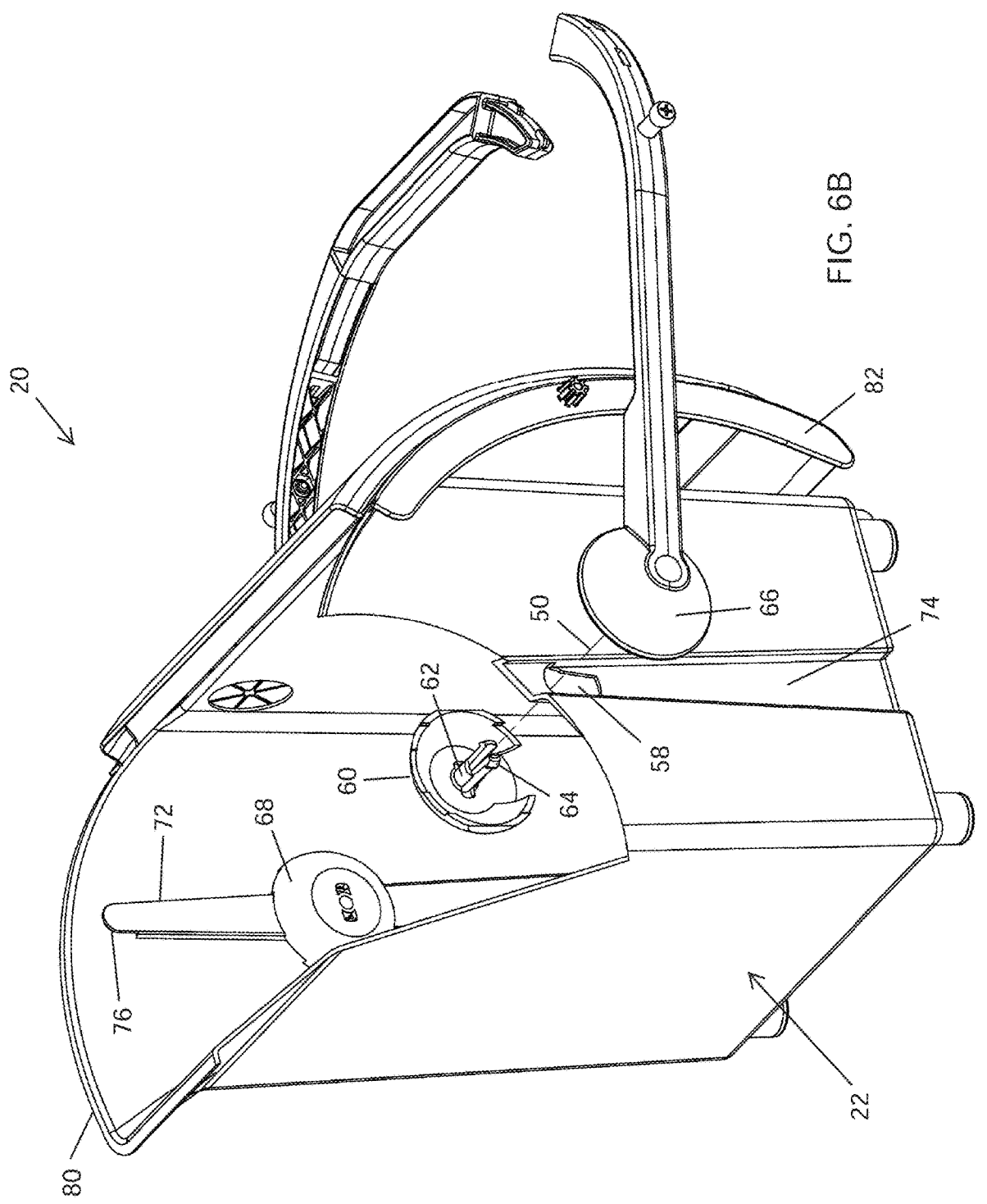

With specific reference to FIGS. 5A, 6A and 6B, a pivot shaft stub 56 projects inwardly at the lower end of each arm 54 and engages a keyhole opening 58 formed in at least one of the side walls 34. Each shaft stub 56 is generally tubular and extends from the outside through the respective keyhole opening 58 and engages an inner axle member 60. The axle member 60 has an outwardly-directed shaft 62 with outward locking pawls on each of multiple flexible fingers 64. The fingers 64 flex inward when pushed into the hollow shaft stub 56 then the locking pawls spring back out again to secure that arm 54 to the main body 22 in a snap-fit assembly. The carry handle arms 54 this snap-connect to the axle members 60, and the shaft stubs 56 and shafts 62 are aligned to form a common rotation shaft. Once secured, the carry handle 26 rotates about the horizontal axis 50.

Both the terminal ends of the handle arms 54 and the axle member 60 include wide shrouds 66, 68 to form smooth covers over their inner workings. In particular, the handle arms 54 terminate in wide conical shrouds 66 that have planar vertical inner edges 67 that fits closely up against the planar side walls 34. Likewise, the axle members 60 (FIG. 6C) each has a more rounded shroud 68 that has a generally planar vertical outer edge 70 that abuts closely against the inner surface of the planar side walls 34. The shrouds 66, 68 not only present smooth exterior surfaces which resists loose items such as the collection bag from snagging, but prevents dirt and pet waste from gunking up the hinge mechanism. Preferably, the locking engagement between the hollow shaft stub 56 holds the edges of the shrouds 66, 68 within about 1-5 mm from the respective side wall 34.

With reference again to FIGS. 5, 6A and 6B, each of the side walls 34 has an inner vertical column 72 molded and extending inward into the inner space 44 of the container. The columns 72 are defined by the mirror image of a vertical channel 74 formed on the exterior of the side walls 34. Each molded column 72 has a narrow triangular vertical profile, and provides stiffness to the side wall 34. The keyhole opening 58 through which the pivot shaft stub 56 projects into the container interior is located within the channel 74. It should be noted with reference to FIG. 6C that the vertical outer edge 70 of the rounded shroud 68 of the axle member 60 is contoured to conform to the shape of the vertical column 72, which serves to further stabilize the engagement of lock members with the lower ends of the handle 26. Namely, upper and lower steps 75a, 75b provide relief to receive the inwardly-projecting vertical column 72. FIGS. 6A and 6B best show a small upward finger 76 formed at the top end of each vertical column 72 slightly spaced away from the inner surface of the side wall 34. The fingers 76 are used to help hold the storage bags in place as will be seen.

As seen in FIGS. 2, 4A and 4B, the carry handle 26 engages the upper lid 24 and displaces it over the upper mouth of the container main body 22. The upper lid 24 has a concave-down shape which slides smoothly over convex upper edges 80 of the side walls 34, best seen in FIG. 5A. In particular, the lid 24 is formed with two outer rails 82 that are spaced just wider than the width dimension of the main body 22, and horizontal ledges 84 just inward from the rails which contact and slide on the convex upper edges 80.

Referring to FIG. 5 and the detailed enlargements of FIGS. 5A-5C, engagement between the pivoting carry handle 26 and the lid 24 is by way of insertion of outward stubs 86 on each rail 82 of the lid 24 into inwardly-opening bores 88 in each of the handle arms 54. Preferably there is a close fit between the stubs 86 and bores 88 which permits relative rotation, and the insertion depth is far enough so as to, in conjunction with the rigidity of the carry handle 26, prevent inadvertent disengagement of the lid 24 from within the handle arms 54.

Referring back to FIG. 4B, the container main body 22 may be tilted so that it is in the horizontal, loading position, at which point the rear end of the lid 24 rests on the rear wall 32. This arrangement enables the lid 24 to be completely retracted rearward, as seen in FIG. 4B, so that the upper mouth of the main body 22 is completely open. This is beneficial when collecting animal waste with the main body 22 tipped on its side, as in FIG. 4B.

Conversely, complete closure of the lid 24 covering the upper mouth of the main body 22 protects the interior from sprinkler spray, rain, snow, etc. The arcuate shape of the lid 24 ensures that when the lid is closed, both front and rear edges are angled downward (see FIG. 3B), thus channeling water to the ground as opposed to back into the container. Furthermore, the outer rails 82 on the side edges of the lid 24 extend downward past and overlap the upper mouth, again preventing ingress of water. This is extremely important to avoid saturating the contents of the container, thus avoiding what could be a complete mess.

With reference now to FIGS. 2 and 5, the container 20 is provided with the convenient scoop 28 which hangs on one side. More particularly, the scoop 28 is preferably molded in three pieces and has an inward recess (not shown) into which fits one of two horizontal pegs 90 extending outward from the handle arms 54. The pegs 90 are provided on both sides of the container 20, as seen in FIG. 5, and thus the scoop 28 may be temporarily suspended from either handle arm 54 for convenience of either left- or right-handers.

Figures 7A, 7B:
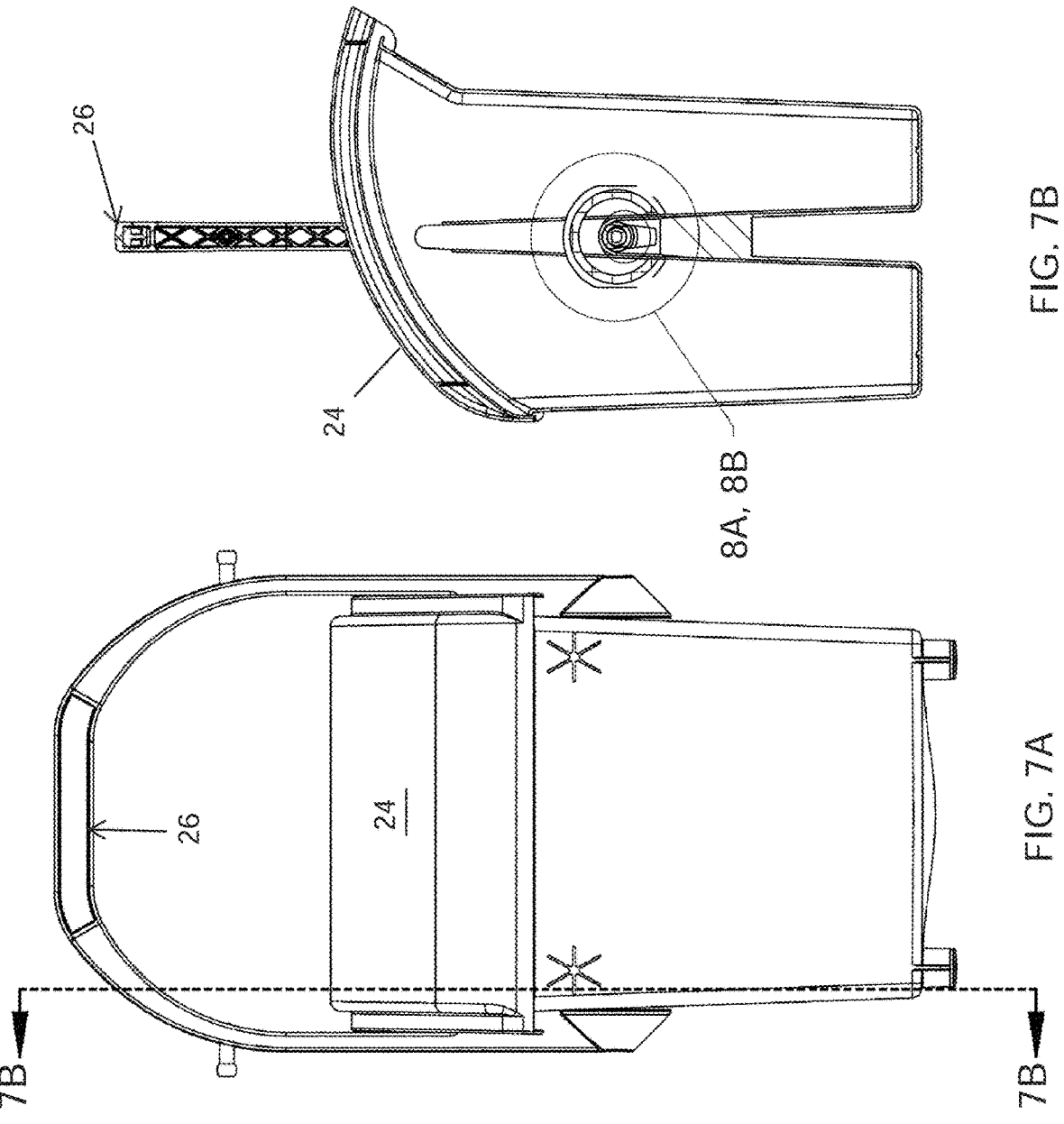
FIG. 7A is a rear elevational view of the animal waste collecting and storage container.
FIG. 7B is a vertical sectional view therethrough illustrating a part of the hinge mechanism.

FIG. 7A is a rear elevational view of the animal waste collecting and storage container, and FIG. 7B is a vertical sectional view therethrough illustrating a part of the hinge mechanism. The preferred configuration of the handle 26 and its hinge mechanism enables the user to easily reset the handle into its vertical configuration with the lid 24 closed, as in FIGS. 1-3. This ensures that the handle 26 is always upright, ready to be grasped, while also maintaining closure of the lid 24 over the open container cavity 44.

Figures 8A, 8B:
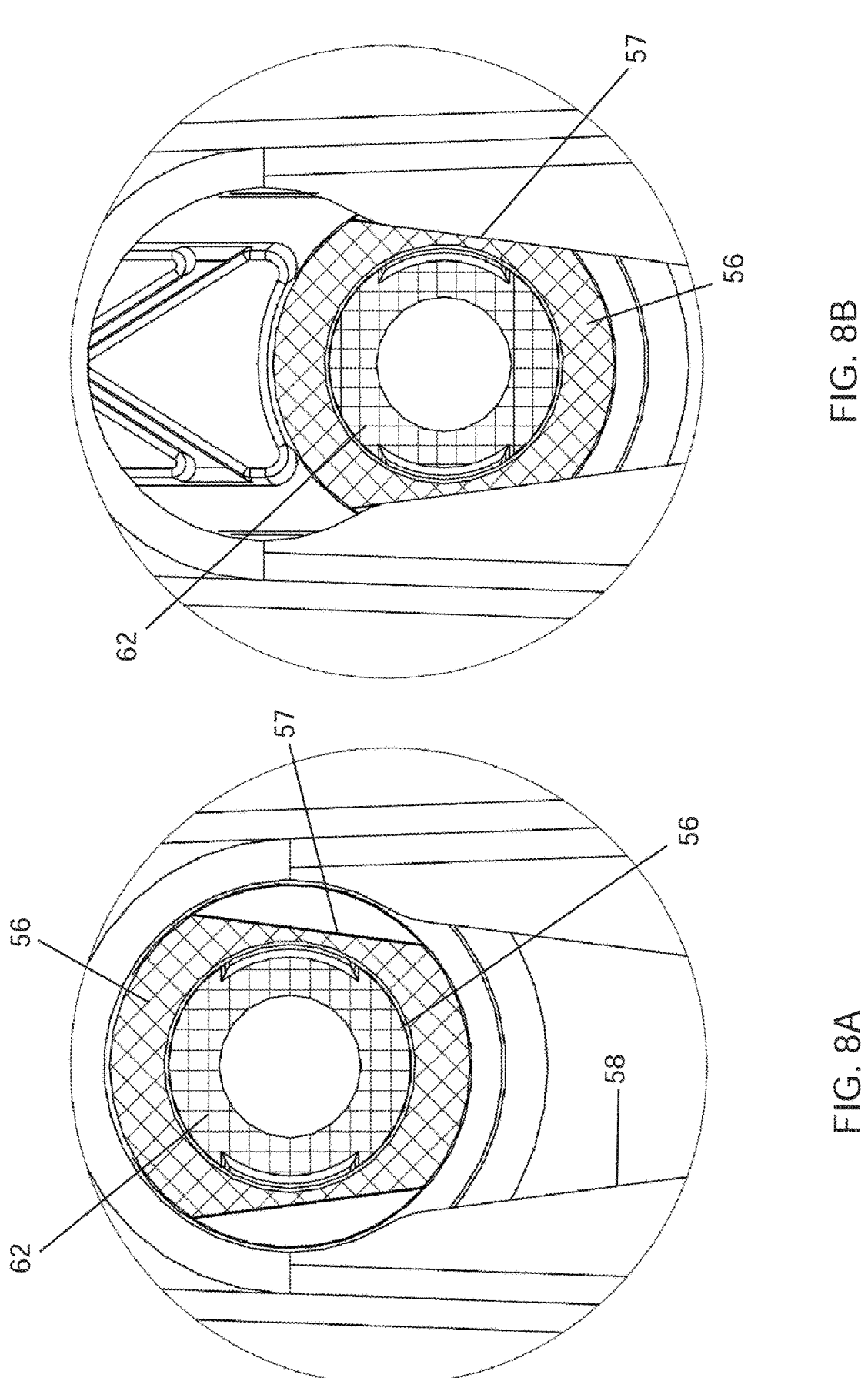
FIGS. 8A and 8B are enlargements from FIG. 7B showing the hinge portion of the carry handle in two positions-unlocked and locked.
Figures 9A, 9B:
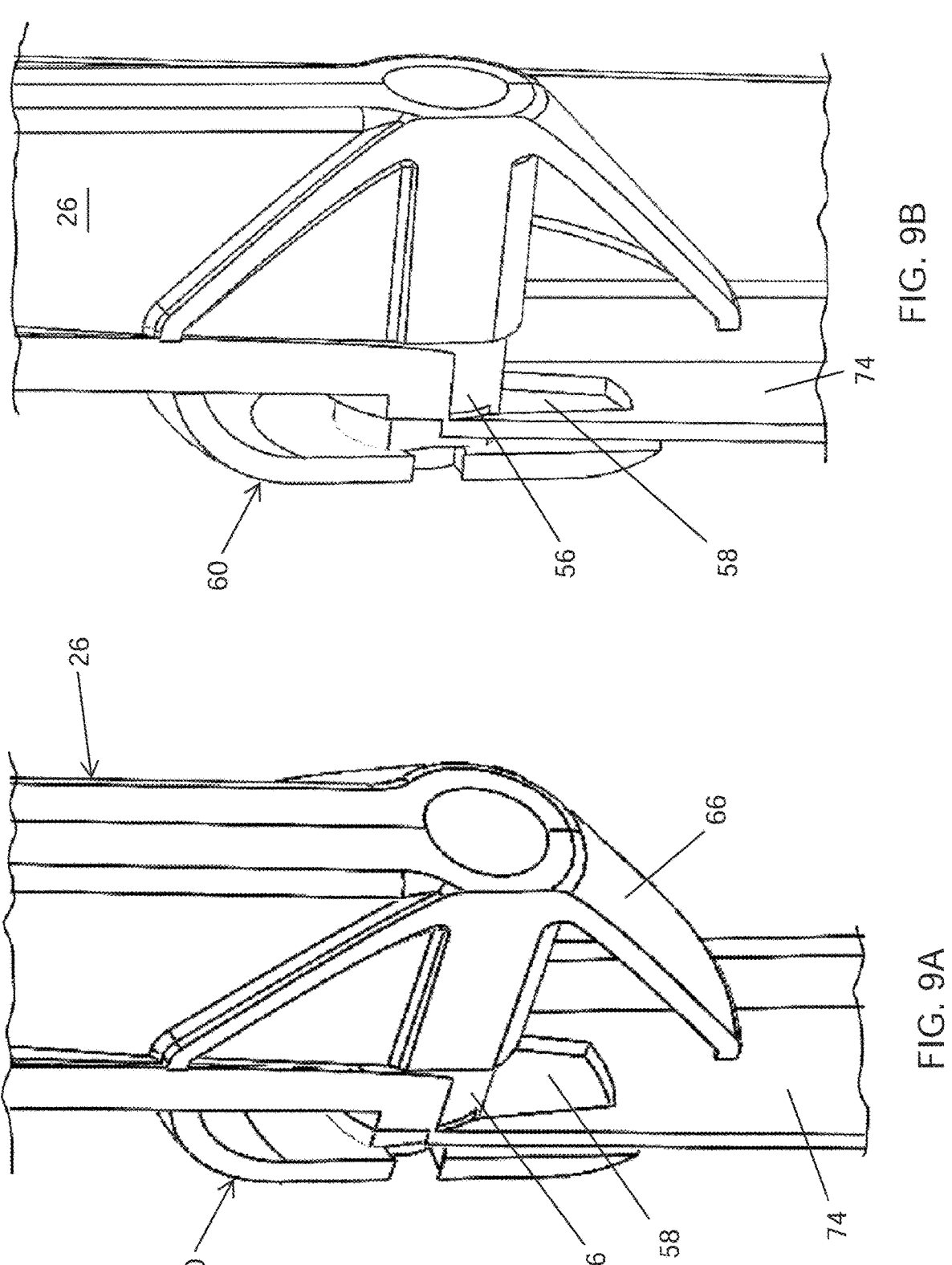
FIGS. 9A and 9B are enlargements showing the hinge portion of the carry handle cutaway in the unlocked position.

This beneficial aspect is partly a function of the shape of the keyhole openings 58, as seen in FIG. 6B, and also in FIGS. 8A and 8B. Namely, each keyhole opening 58 has a larger generally rounded upper end and tapers down to a narrower more slot-like lower end. The outwardly-directed shaft 62 of each axle member 60, seen best in FIG. 6C, is generally cylindrical in shape up to the flexible fingers 64. When the axle member 60 is assembled to the main body 22, the shaft 62 is inserted through the upper end of the keyhole opening 58 and snapped into engagement with one of the pivot shaft stubs 56 at the lower end of the handle 26. As seen in FIG. 5A, the pivot shaft stub 56 is mostly cylindrical with a pair of slightly tapered flats 57 on either lateral side. The opposite flats 57 align laterally with the keyhole openings 58 and are spaced apart about the same dimension and similarly tapered as the slot-like lower end of the keyhole opening 58. FIGS. 9A and 9B are enlargements showing the hinge portion of the carry handle 26 with shaft stub 56 in the up or unlocked position within the keyhole opening 58.

FIGS. 8A and 8B show the handle hinge mechanism in two positions-unlocked and locked. Once the shaft stub 56 and shaft 62 are assembled through the upper end of the keyhole opening 58, they may be lowered so that the flats 57 on the shaft stub 56 fit tightly into the slot-like lower end of the keyhole opening 58. This ensures that the handle 26 remains vertical, and the lid 24 is closed over the open top of the container main body 22. To rotate the handle 26, and slide the lid 24 open, the user simply lifts up on the handle, which puts the shaft stub 56 and shaft 62 at the upper rounded end of the keyhole opening 58. Rotation is permitted and the orientation of the flats 57 is such that the handle 26 will not lock back into its docked upright position until the user moves or allows the handle to drop back down to a vertical orientation, and allows the hinge mechanism to slide down within the keyhole opening 58. It should be noted that this keyhole locking arrangement may only be provided on one side of the container main body 22, though having it on both sides is believed more robust.

Tapering the keyhole opening 58 and also the flats 57 on the shaft stub 56 ensures a tight fit therebetween, as the lowest end of the keyhole opening 58 is slightly smaller than the smallest width across the flats 57. The included taper angle of the keyhole opening 58 and also the flats 57 is preferably about 15°. The handle shaft thus "wedges" down into the keyhole opening 58 for a firm frictional interaction which reliably holds the handle 26 upright. However, because the handle 26 is not overly heavy, the frictional hold is easily overcome when the handle 26 is lifted up to enable rotation. Moreover, providing the wide shrouds 66, 68 on both inner and outer surfaces stabilizes the assembly and helps maintain alignment of the handle 26, resisting twisting. Finally, while the inner shroud 66 rotates smoothly against the flat outer walls 34 of the main body 22, the inner shroud 68 remains stationary. The upper and lower steps 75a, 75b seen in FIG. 6C bracket the inwardly-projecting vertical columns 72 such that the entire inner axle member 60 along with the fixed shaft 62 remains rigid so that the handle 26 can rotate therearound without twisting.

Figure 10:
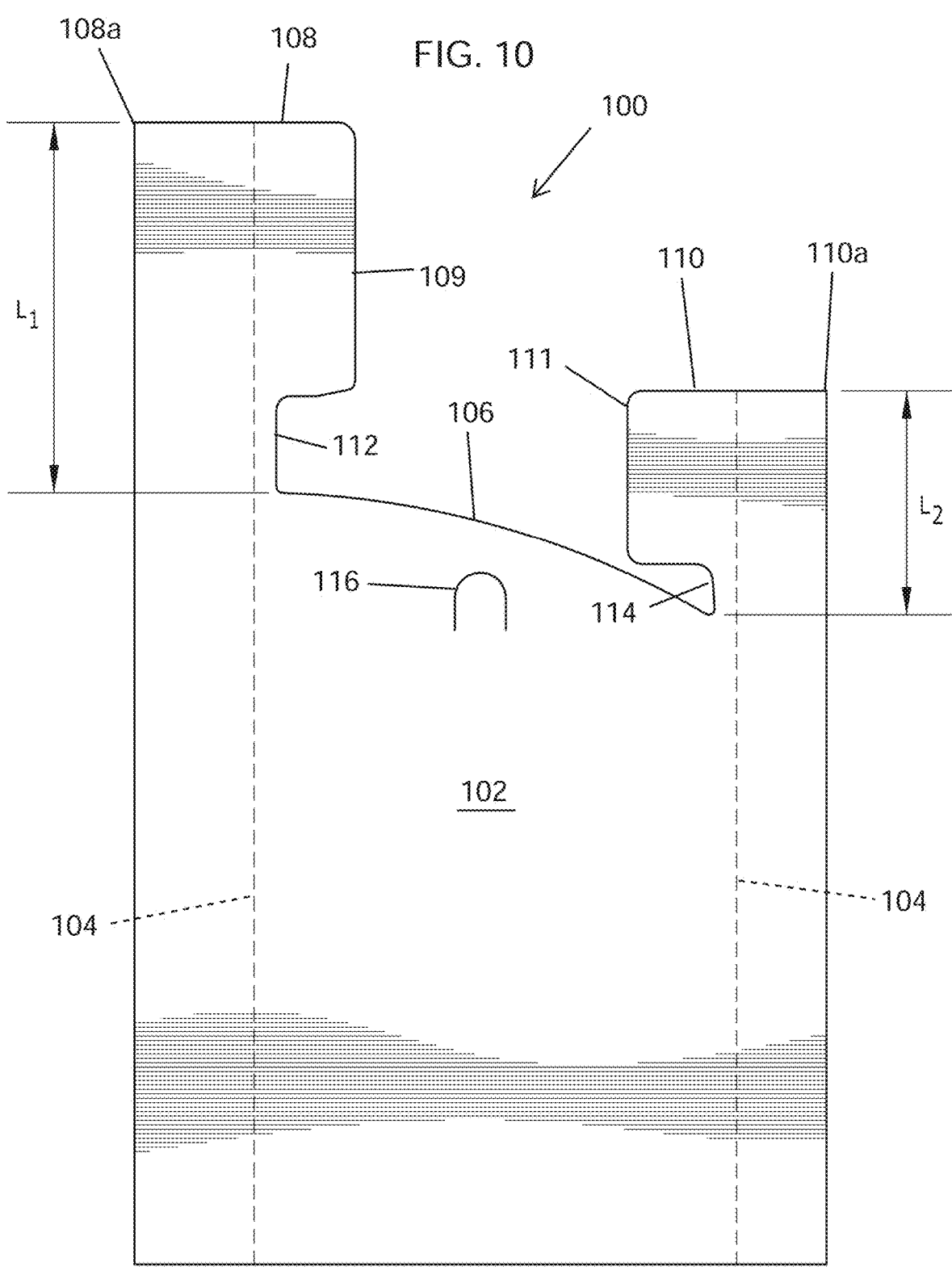
FIG. 10 is an exemplary laid flat disposable bag for use with the collecting and storage container.

FIG. 10 is an exemplary laid flat disposable bag 100 for use with the collecting and storage container 20. The bag 100 has a pair of generally rectangular side panels 102 separated by material at front (left) and rear (right) sides that is folded inward in vertical gussets 104. An open arcuate top edge 106 is flanked by a pair of upstanding pairs of tabs 108, 110 formed as extensions from the side panels 102. The open or separable portion at the upper edge of the bag 100 extends between corners 108a, 110a on the respective tabs 108, 110. Since the folded gussets 104 continue up to the upper edge of the tabs 108, 110, the tabs are separable to the full width of the bag 100, which matches the width of the container main body 22. Each tab 108, 110 further has a flap 109, 111 which extends inward toward the other flap, and projects beyond a narrower neck 112, 114 that connects back to the arcuate top edge 106. Again, the entire upper edge from the outer corners 108a, 110a of the tabs 108, 110 and across the top edge 106 is open so that the side panels 102 can be separated and the bag expanded to define an inner volume. A small inverted U-shaped slit 116 is cut near the top edge 106 in the center through each side panel 102. This slit 116 forms a curved cutout which is used to help hold the bag open within the container 20, as will be seen.

The taller front tab 108 has a length L1 that is longer than the length L2 of the shorter rear tab 110. Additionally, the front tab 108 commences at a higher position on the bag 100 than the rear tab 110, such that the arcuate top edge 106 is angled downward from the front to the rear. These shapes match the contours of the container main body 22 and facilitate securement of the bag 100 therein, as will be seen below. In one embodiment, L1 is 190 mm and L2 is 131 mm.

For an overall bag size to fit a particular size of container main body 22, the laid flat shape has a width of 400 mm and a height from a lower edge to the top of the taller front tab 108 of 680 mm. With a gusset width of between 50-65 mm, the periphery of the expanded bag works out to be between 1000-1060 mm, or an area of between about 400-520 cm2. Of course, once expanded the bag 100 does not assume an exact rectangular cross-section, and the area and thus inner volume will vary depending on shape, and of course size, of container in which the bag is designed to fit.

Figure 11A:
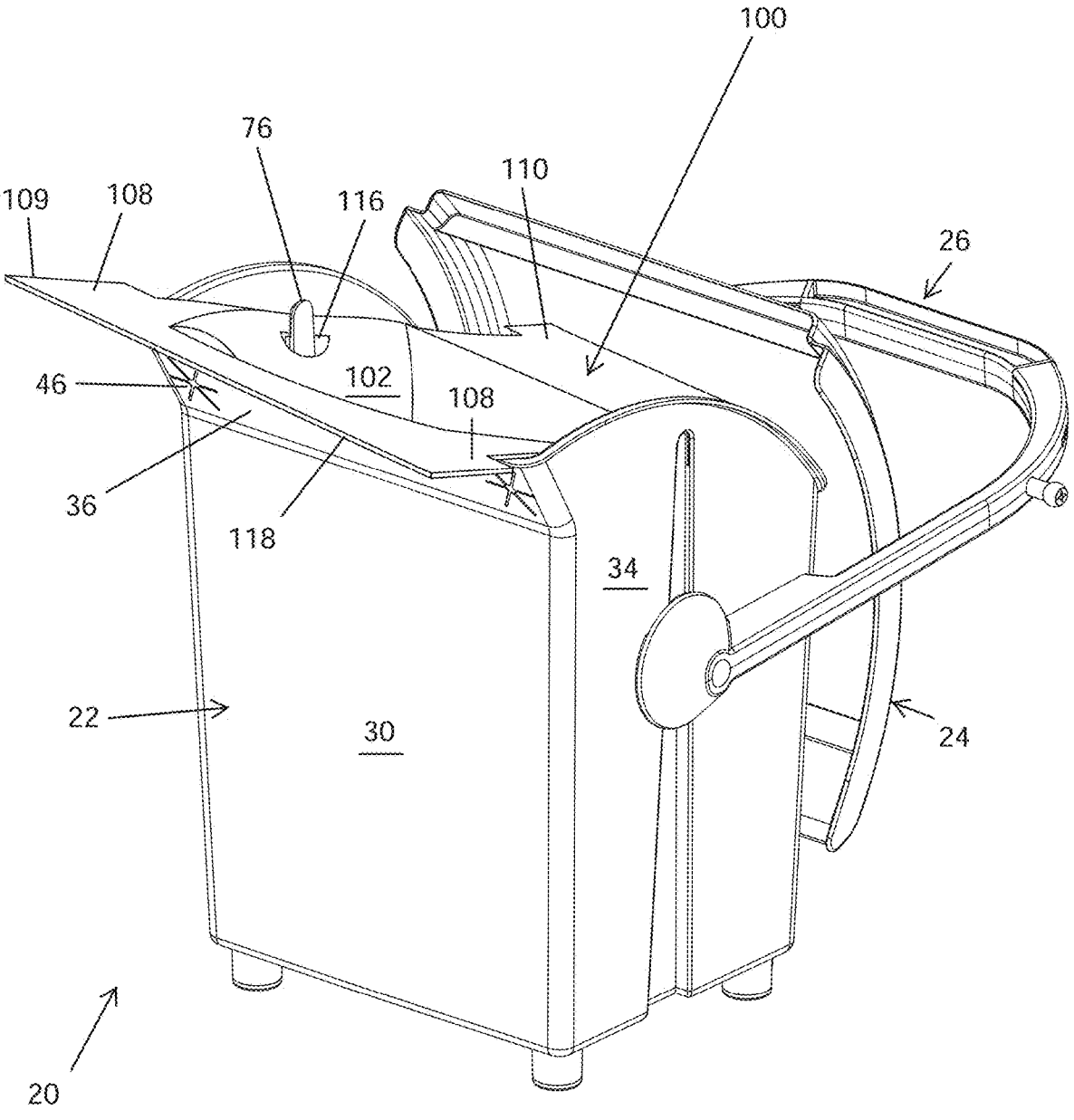
FIGS. 11A and 11B are perspective views of the disposable bag being secured within the container.
Figure 11B:
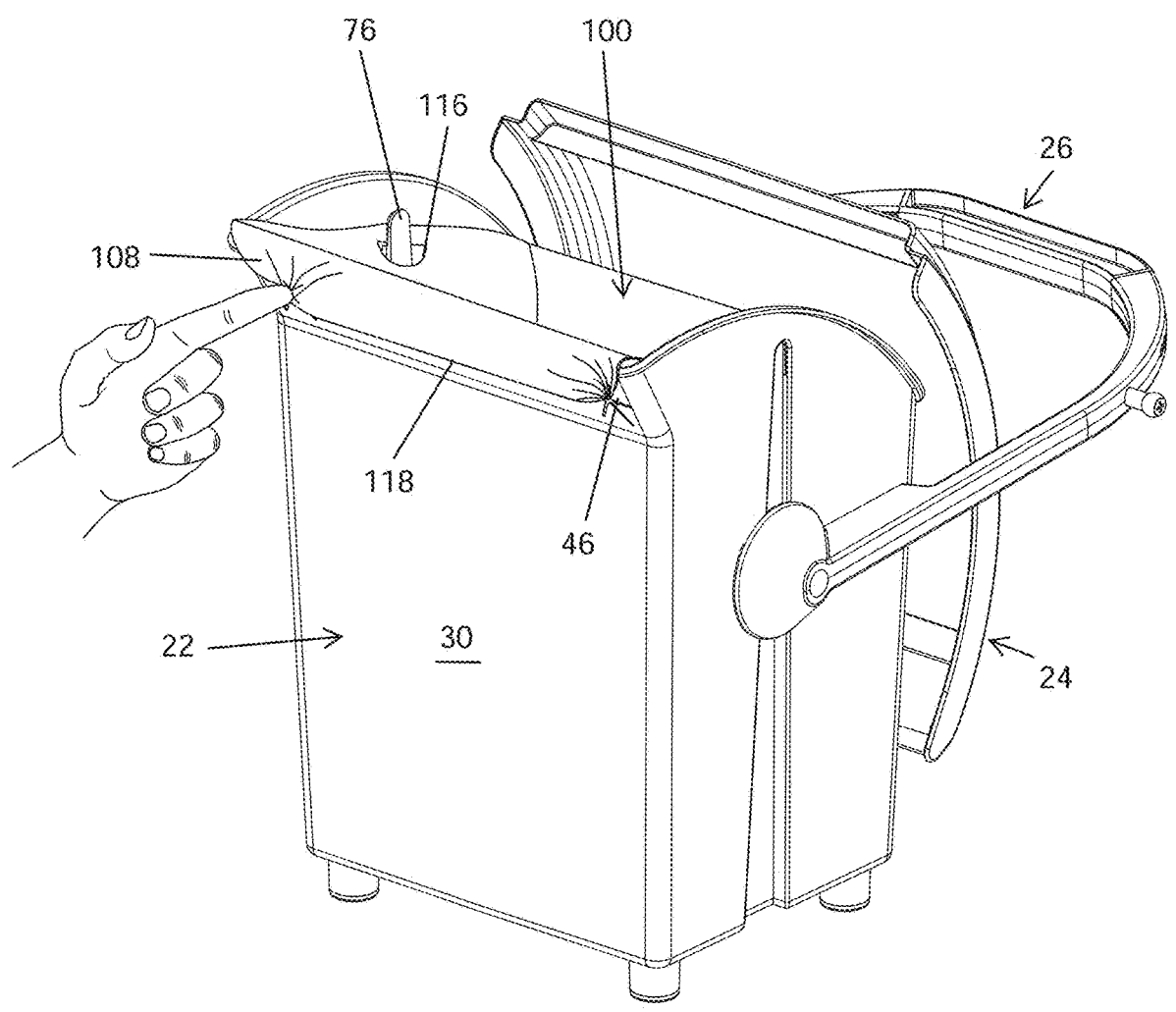

FIGS. 11A and 11B are perspective views of the expanded disposable bag 100 being secured within the container main body 22. The bag 100 is first expanded by separating the side panels 102 which open along the upper edges between the outer corners 108a, 110a. A closed end of the expanded bag 100 is then inserted down into the cavity 44 within the main body 22, as seen in FIG. 11A. The curved cutouts defined by the inverted U-shaped slits 116 on each side panel 102 are hung onto the fingers 76 formed at the top end of the vertical columns 72 (see also FIG. 6B), which pulls the side panels 102 outward against the inner face of side walls 34 of the main body 22.

Each of the tabs 108, 110 may be separately extended around the front and rear edges of the upper mouth of the container main body 22 and pressed into the star-shaped retainers 46, as seen in FIG. 11B. Because the leaves of the retainers 46 are flexible, the tabs 108, 110 of the bag 100 are easily pressed past and retained therein. Furthermore, the leaves are sufficiently flexible so as to easily enable easy removal of the tabs 108, 110 from the retainers 46. Of course, alternative retainers such as hooks, clips or the like may be utilized with bags that have loop-shaped handles rather than lobes.

FIG. 11B shows the bag 100 secured within the container main body 22. As explained, two of the tabs 108 extend outward over the front lip 38 (FIG. 4A) of the main body 22 to be secured by pushing them through the leaves 48 of the two front retainers 46. The rear two tabs 110 extend outward over the rear lip (not numbered) and are secured by pushing them through the leaves of the two rear retainers 46. The bag 100 is shaped such that a linear front edge 118 thereof extends over the width of the front lip 38 to help keep the main body 22 free of animal waste. The securement of the bag 100 by the four tabs 108, 110 in the retainers 46 as well as looping the curved cutouts defined by the inverted U-shaped slits 116 over the column fingers 76 holds the bag within the inner space 44 while making removal easy-one need only grasp the tabs 108, 110 and pull them out of the retainers 46.

FIGS. 11A and 11B show the collecting and storage container 20 with the handle 26 pivoted rearward to displace the upper lid 24 to a completely or fully open position and expose the inner space 44 within the container when replacing a disposable bag 100 therein. To facilitate this operation, a separation is created between the forward edge of the lid 24 and the rear upper edge of the container main body 22. Thus, the user can easily remove the previous disposable bag 100 and replace it with another, with the lid 24 being completely removed as an impediment to pressing the tabs 108, 110 of the bag into the retainers 46 in the rear wall 32. The rear edge of the lid 24 is seen in contact with the lower edge of the rear wall 32 in FIG. 4B which prevents it from touching the ground and helps keep it clean.

Figure 12A:
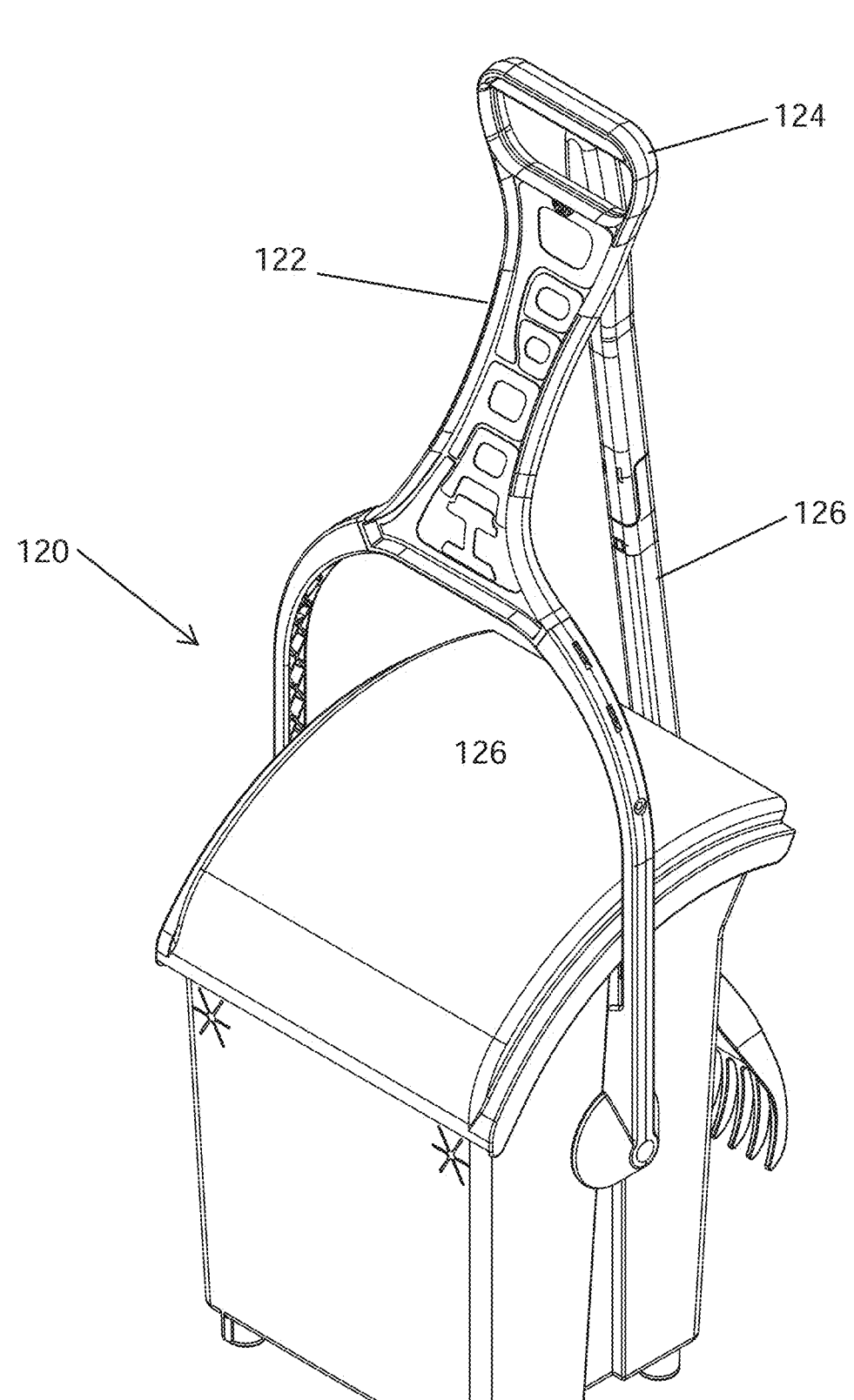
FIGS. 12A-12C are perspective and elevational views of an alternative taller animal waste collecting and storage container of the present application having a curved handle.
Figure 12B:
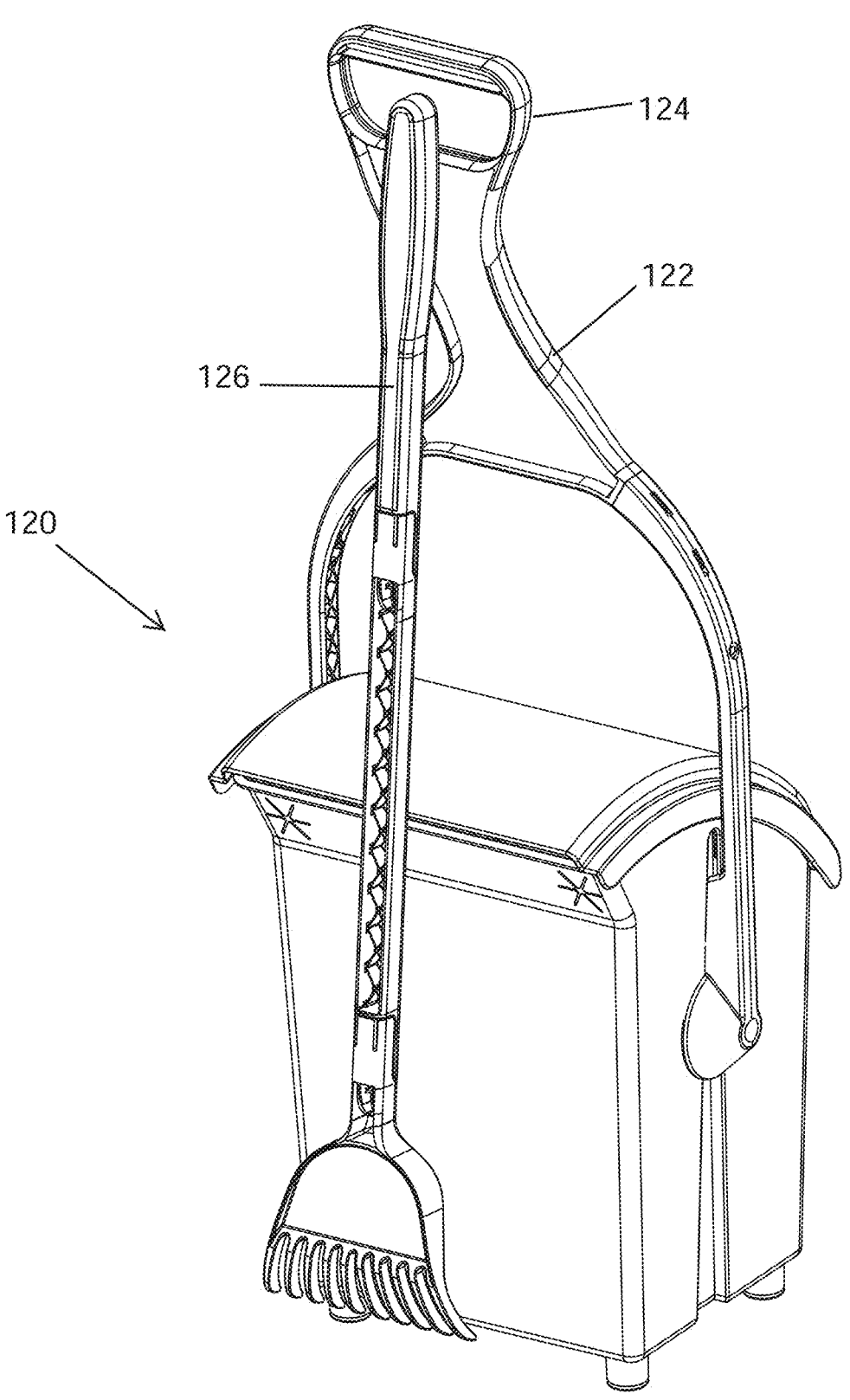
Figure 12C:
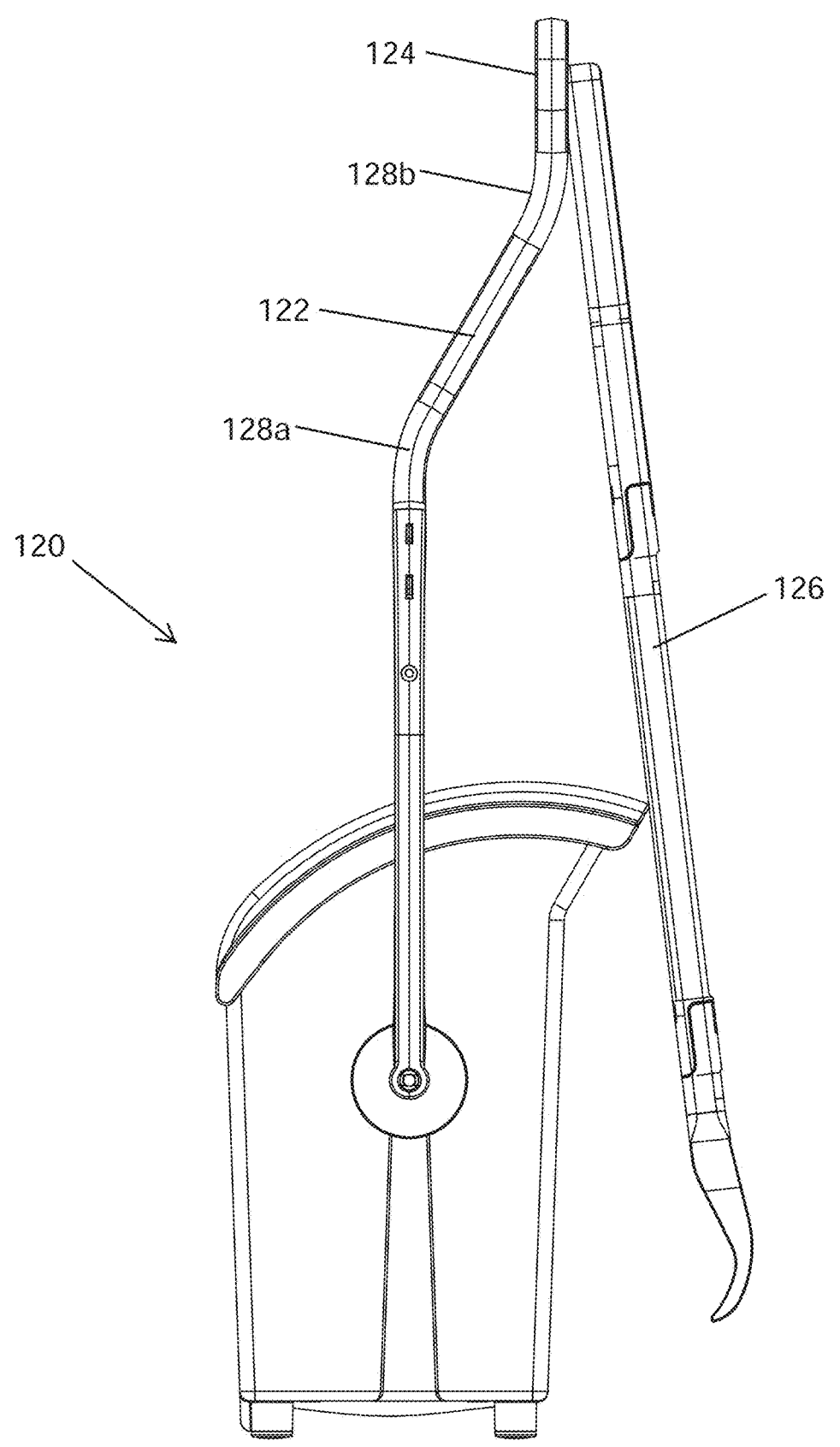

FIGS. 12A-12C are perspective and elevational views of an alternative taller animal waste collecting and storage container 120 having a curved handle 122. The storage container 120 may have about the same capacity as the earlier embodiment, but stands taller such that an upper handle grip 124 is elevated to between about 3-4 feet for ease of grabbing. In addition, a taller shovel-like scoop or scooper 126 that hangs from a pin on the handle grip 124 further makes operating the container easier for taller people (no stooping). FIG. 12C shows a first bend 128a in the handle 122 and a higher second bend 128b. The first bend 128a is above a vertical lower segment and angles to the front of the container 120, and the second bend 128b is angled opposite to return the upper grip 124 to a vertical orientation. This serpentine handle structure is found to provide better maneuverability to the taller container 120. All other aspects are as described above with respect to the first embodiment.

Conclusion

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

The invention claimed is:

1. A portable animal waste collection and storage container, comprising:
   a main body having generally vertical walls defining an inner space therein, an upper mouth of the main body defining convex side edges and front and rear lips, the main body having bag retainers located below the upper mouth on both front and rear walls thereof, the bag retainers adapted to secure upper edges of a disposable bag so as to suspend a main portion of a bag within the inner space;
   a carry handle arranged to pivot forward and rearward about a horizontal axis extending through side walls in the main body; and
   an arcuate upper lid having a concave lower contour which matches the convex side edges such that the upper lid may slide smoothly over the upper mouth, the upper lid being rotatably coupled to the carry handle so that pivoting movement of the carry handle causes commensurate sliding movement of the upper lid over the upper mouth, and wherein
   the carry handle is fixed to a rotation shaft which is vertically movable within a keyhole opening in at least one of the side walls, and the rotation shaft and keyhole opening cooperate such that the carry handle can only rotate relative to the main body when the rotation shaft is in an upper position within the keyhole opening.

2. The container of claim 1, wherein the arcuate upper lid has a pair of outward stubs extending in opposite directions and extending laterally outward therefrom into openings formed in the carry handle to rotatably couple the carry handle to the arcuate upper lid.

3. The container of claim 1, wherein the rotation shaft includes a shaft stub on the carry handle extending laterally inward that securely connects to a shaft on an inner axle member positioned against an inner face of the at least one side wall, the rotation shaft extending through the at least one side wall, and the rotation shaft is keyed to the keyhole opening via flats formed on both lateral sides of the rotation shaft.

4. The container of claim 3, wherein the keyhole opening has a rounded upper end and tapers down to a narrower lower end in which the flats formed on the rotation shaft closely fit.

5. The container of claim 3, wherein the inner axle member has a conical shroud around the shaft to provide a smooth inwardly-facing surface.

6. The container of claim 3, wherein the carry handle includes a pair of vertical arms that flank the side walls of the main body and each are fixed to one of the rotation shafts vertically movable within one of the keyhole openings in each side wall.

7. The container of claim 6, wherein each of the arms of the carry handle terminates in a conical shroud around the shaft stub to provide a smooth outwardly-facing surface.

8. The container of claim 1, further including a disposable bag adapted to be suspended within the inner space of the container, the disposable bag having a pair of generally rectangular side panels separated by material at front and rear sides that is connected by inward folds forming vertical gussets so that the side panels can be separated and the bag expanded to define an inner volume, the bag further having an open or separable upper edge that extends between corners on front and rear tabs formed as extensions of the side panels, the front and rear tabs extending upward from a top edge of a main part of the side panels so that when the side panels are separated and the bag expanded beyond the front and rear lips of the main body, the front and rear tabs can be secured to the bag retainers.

9. The container of claim 8, wherein the front wall of the main body is taller than the rear wall, and the front tab is taller than the rear tab.

10. The container of claim 8, wherein the bag retainers comprise flexible leaves or petals defining star- or spoke-shaped openings into which the tabs of the bag can be pushed and captured.

11. The container of claim 8, wherein the bag includes slits near the top edge of the main part of each side panel, and the main body has upward fingers at the top of each of the side walls of the main body sized to pass through the slits to support the bag within the inner space of the main body.

12. A portable animal waste collection and storage container, comprising:
   a main body having generally vertical walls defining an inner space therein, an upper mouth of the main body defining side edges and front and rear lips;
   a carry handle arranged to pivot forward and rearward about a horizontal axis extending through side walls in the main body; and
   an upper lid having a lower contour which matches the upper mouth such that the upper lid may slide smoothly over the upper mouth, the upper lid having a pair of outward stubs extending in opposite directions and extending laterally outward therefrom into openings formed in the carry handle to rotatably couple the carry handle to the upper lid so that pivoting movement of the carry handle causes commensurate sliding movement of the upper lid over the upper mouth, and wherein
   the carry handle is fixed to a rotation shaft which is vertically movable within a keyhole opening in at least one of the side walls, and the rotation shaft and keyhole opening cooperate such that the carry handle can only rotate relative to the main body when the rotation shaft is in an upper position within the keyhole opening.

13. The container of claim 12, wherein the rotation shaft includes a shaft stub on the carry handle extending laterally inward that securely connects to a shaft on an inner axle member positioned against an inner face of the at least one side wall, the rotation shaft extending through the arcuate side wall, and the rotation shaft is keyed to the keyhole opening via flats formed on both lateral sides of the rotation shaft.

14. The container of claim 13, wherein the keyhole opening has a rounded upper end and tapers down to a narrower lower end in which the flats formed on the rotation shaft closely fit.

15. The container of claim 13, wherein the inner axle member has a conical shroud around the shaft to provide a smooth inwardly-facing surface.

16. The container of claim 13, wherein the carry handle includes a pair of vertical arms that flank the side walls of the main body and each are fixed to one of the rotation shafts vertically movable within one of the keyhole openings in each side wall.

17. The container of claim 16, wherein each of the arms of the carry handle terminates in a conical shroud around the shaft stub to provide a smooth outwardly-facing surface.

18. The container of claim 12, further including a disposable bag adapted to be suspended within the inner space of the container, the disposable bag having a pair of generally rectangular side panels separated by material at front and rear sides and connected by inward folds forming vertical gussets so that the side panels can be separated and the bag expanded to define an inner volume, the bag further having an open or separable upper edge that extends between corners on front and rear tabs formed as extensions of the side panels, the front and rear tabs extending upward from a top edge of a main part of the side panels so that when the side panels are separated and the bag expanded beyond the front and rear lips of the main body, the front and rear tabs can be secured to bag retainers located below the upper mouth on both front and rear walls of the main body.

19. The container of claim 18, wherein the front wall of the main body is taller than the rear wall, and the front tab is taller than the rear tab.

20. The container of claim 18, wherein the bag retainers comprise flexible leaves or petals defining star- or spoke-shaped openings into which the tabs of the bag can be pushed and captured.

21. The container of claim 18, wherein the bag includes slits near the top edge of the main part of each side panel, and the main body has upward fingers at the top of each of the side walls of the main body sized to pass through the slits to support the bag within the inner space of the main body.

\* \* \* \* \*